(12) United States Patent
Li

(10) Patent No.: US 12,418,055 B2
(45) Date of Patent: Sep. 16, 2025

(54) POWER CONDITIONING SUBSYSTEM

(71) Applicant: TMEIC Corporation, Chuo-ku (JP)

(72) Inventor: Haiqing Li, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 535 days.

(21) Appl. No.: 17/998,279

(22) PCT Filed: Apr. 28, 2021

(86) PCT No.: PCT/JP2021/017072
§ 371 (c)(1),
(2) Date: Nov. 9, 2022

(87) PCT Pub. No.: WO2022/230142
PCT Pub. Date: Nov. 3, 2022

(65) Prior Publication Data
US 2023/0238592 A1    Jul. 27, 2023

(51) Int. Cl.
*H01M 10/44* (2006.01)
*H01M 10/48* (2006.01)
*H02J 7/00* (2006.01)

(52) U.S. Cl.
CPC .......... *H01M 10/44* (2013.01); *H01M 10/48* (2013.01); *H02J 7/007* (2013.01)

(58) Field of Classification Search
None
See application file for complete search history.

(56) References Cited

U.S. PATENT DOCUMENTS

2016/0325633 A1* 11/2016 Yoshida .............. B60W 50/082
2018/0181874 A1*  6/2018 Nishikawa ............ G16B 40/00

FOREIGN PATENT DOCUMENTS

JP    2015-149840 A    8/2015
JP    2016-140164 A    8/2016

OTHER PUBLICATIONS

International Search Report & Written Opinion issued Jul. 6, 2021 in PCT/JP2021/017072, filed on Apr. 28, 2021, 11 pages.

* cited by examiner

*Primary Examiner* — Julian D Huffman
*Assistant Examiner* — Sadia Kousar
(74) *Attorney, Agent, or Firm* — Oblon, McClelland, Maier & Neustadt, L.L.P.

(57) ABSTRACT

A power conditioning subsystem (PCS) includes an inverter circuit configured to mutually covert direct current (DC) power of a storage battery and alternating current (AC) power, a command value acquiring portion configured to acquire a command value from a higher-level apparatus to charge or discharge the storage battery, a DC voltage acquiring portion configured to acquire a DC voltage on the storage battery side, and a limiter processing portion configured to perform a process of setting to limit each of an upper limit and a lower limit of the command value acquired by the command value acquiring portion on the basis of the DC voltage acquired by the DC voltage acquiring portion.

4 Claims, 6 Drawing Sheets

POWER CONDITIONING SUBSYSTEM

FIELD

The present invention relates to a power conditioning subsystem.

BACKGROUND

A power conditioning subsystem (PCS) to be connected to a storage battery performs forward and inverse conversions between alternating current (AC) power and direct current (DC) power to charge and discharge the storage battery, by controlling gate pulses to an inverter circuit (power conditioning circuit), for example.

For example, there is well known an energy management system (EMS) that calculates a control plan value for charging and discharging a power storage device, to provide, to the PCS, a charging and discharging instruction to the storage battery (for example, see PTL 1).

Thus, the power conditioning subsystem connected to the storage battery controls an output for charging and discharging the storage battery according to a command value from a higher-level apparatus such as the EMS.

CITATION LIST

Patent Literature

[PTL 1] JP 2015-149840 A

SUMMARY

Technical Problem

However, a conventional power conditioning subsystem cannot generally obtain the operation information such as states of charge (SOC) of the storage battery, and in the case of being operated according to the charging and discharging instruction from the higher-level apparatus, an overcharge or overdischarge may occur in the storage battery.

The present invention has been made to solve the above-described problem, and has an object to provide a power conditioning subsystem capable of preventing an overcharge or overdischarge of a storage battery with a simple configuration.

Solution to Problem

A power conditioning subsystem according to one aspect of the present invention includes an inverter circuit configured to mutually covert direct current (DC) power of a storage battery and alternating current (AC) power, a command value acquiring portion configured to acquire a command value from a higher-level apparatus to charge or discharge the storage battery, a DC voltage acquiring portion configured to acquire a DC voltage on the storage battery side, and a limiter processing portion configured to perform a process of setting to limit each of an upper limit and a lower limit of the command value acquired by the command value acquiring portion on the basis of the DC voltage acquired by the DC voltage acquiring portion.

Advantageous Effects of Invention

According to the present invention, a storage battery can be prevented from being overcharged or overdischarged with a simple configuration.

DESCRIPTION OF EMBODIMENTS

Figure 1:
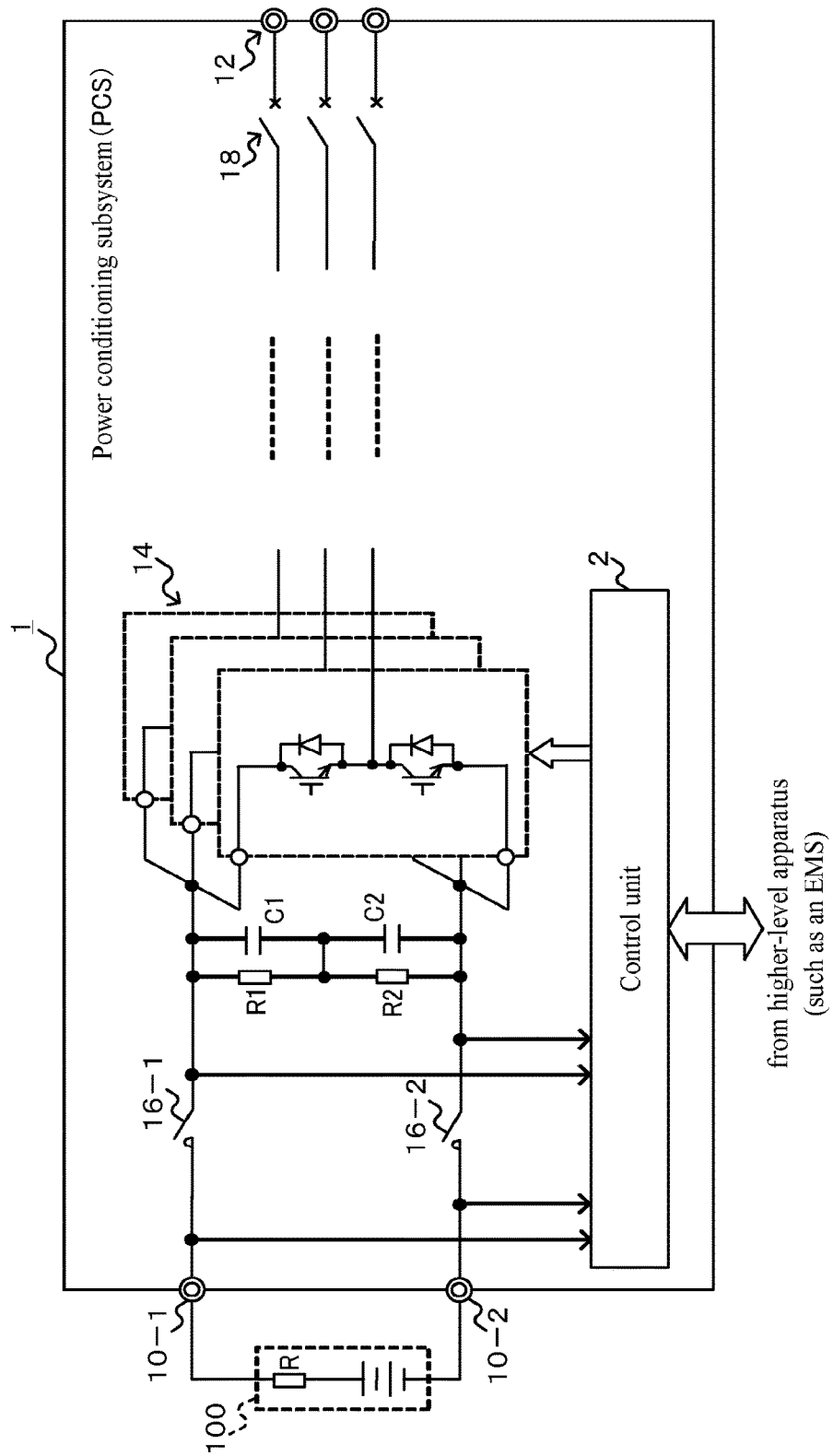
FIG. 1 is a diagram illustrating a configuration example of a power conditioning subsystem (PCS) according to an embodiment.

Hereinafter, an embodiment of a power conditioning subsystem will be described using the drawings. FIG. 1 is a diagram illustrating a configuration example of a power conditioning subsystem (PCS) 1 according to an embodiment.

In the power conditioning subsystem 1, a charging and discharging operating range is set to between 660 V to 1200 V, for example, and a storage battery 100 is connected to direct current (DC) power supply connecting portions 10-1 and 10-2. In the storage battery 100, a charging and discharging operating range of a battery voltage is set to between 710 V to 970 V, for example.

The power conditioning subsystem 1 mutually convers DC power and alternating current (AC) power between the DC power supply connecting portions 10-1 and 10-2 and a three-phase system connecting portion 12 to charge and discharge the storage battery 100 on the basis of a charging and discharging instruction from a higher-level apparatus (such as an EMS).

The power conditioning subsystem 1 includes a three-phase inverter circuit (power conditioning circuit) 14 configured to mutually convert the DC power of the storage battery 100 and the three-phase AC power that is input and output via the system connecting portion 12.

DC current breakers 16-1 and 16-2 for interrupting a DC current are provided between the DC power supply connecting portions 10-1 and 10-2 and the inverter circuit 14. Additionally, a DC intermediate circuit including R1, R2 and C1, C2 is provided between the DC current breakers 16-1 and 16-2 and the inverter circuit 14. An AC current breaker 18 for interrupting a three-phase AC current is provided between the system connecting portion 12 and the inverter circuit 14.

A control unit 2 is provided in the power conditioning subsystem 1, and controls each component included in the power conditioning subsystem 1. For example, the control unit 2 controls gate pulses to the inverter circuit 14 on the basis of the charging and discharging instruction from the higher-level apparatus, thereby causing the inverter circuit 14 to perform forward and inverse conversions between the AC power and the DC power to charge and discharge the storage battery 100.

At this time, the control unit 2 acquires a DC input voltage of the storage battery 100. The control unit 2 may acquire the DC input voltage generated at a site between the DC power supply connecting portions 10-1 and 10-2 as an example of a site where the DC input voltage is to be detected. Additionally, the control unit 2 may acquire a capacitor voltage between the DC current breakers 16-1 and 16-2 and the inverter circuit 14. Furthermore, the battery voltage information may be transferred from the storage battery 100 or the higher-level apparatus (such as an EMS) by means of a communication device, etc.

Figure 2:
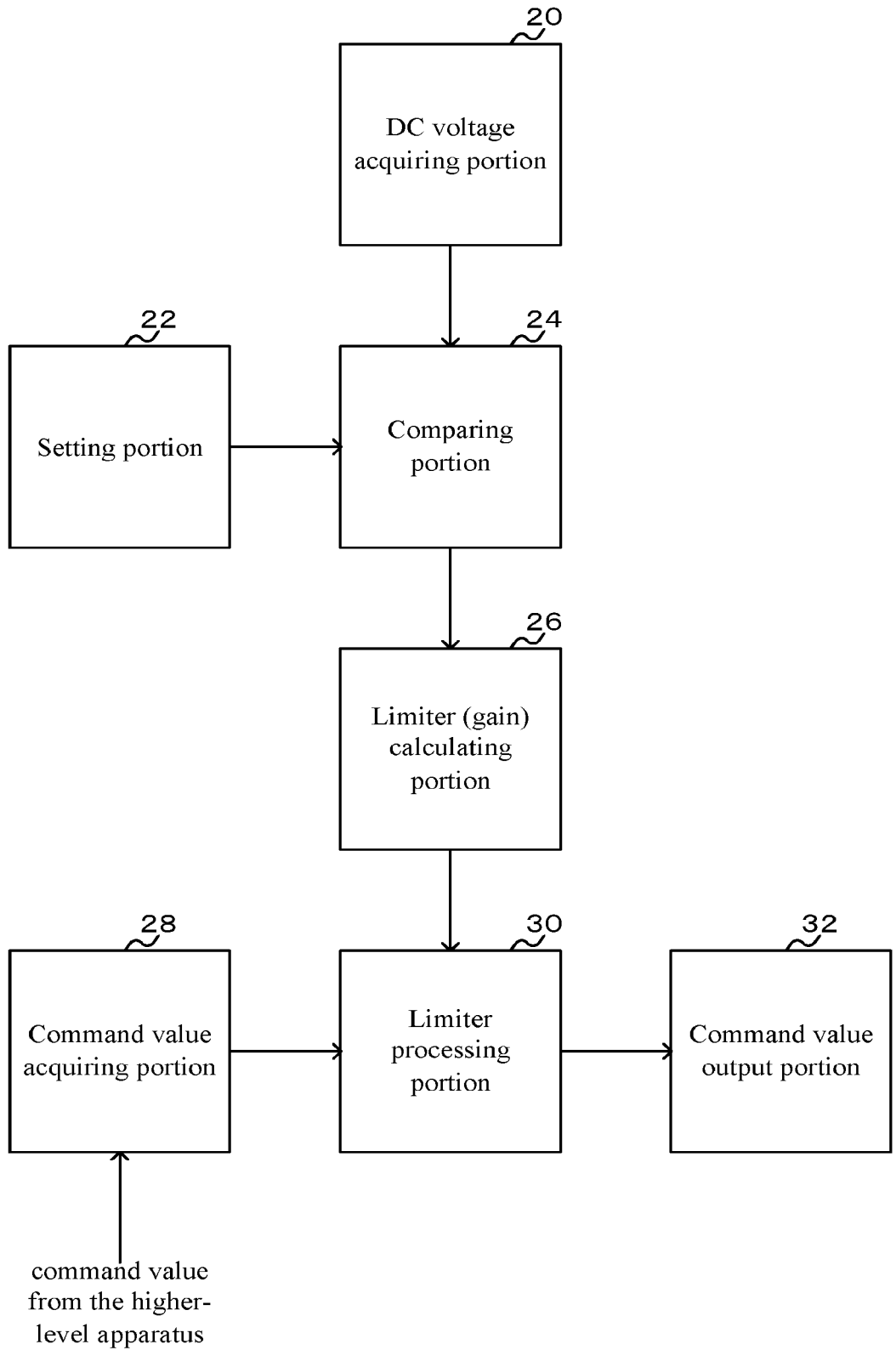
FIG. 2 is a functional block diagram illustrating functions of a control unit.

FIG. 2 is a functional block diagram illustrating functions of the control unit 2. As illustrated in FIG. 2, the control unit 2 includes, for example, a DC voltage acquiring portion 20, a setting portion 22, a comparing portion 24, a limiter (gain) calculating portion 26, a command value acquiring portion 28, a limiter processing portion 30, and a command value output portion 32.

The DC voltage acquiring portion 20 periodically acquires DC voltages of the storage battery 100 at a predetermined timing via the DC power supply connecting portions 10-1 and 10-2, for example. The command value acquiring portion 28 periodically acquires charging and discharging command values from the higher-level apparatus at a predetermined timing through the communication, for example. For example, to discharge the storage battery 100, the command value is set to a value within a range from 0% to +100%. To charge the storage battery 100, the command value is set to a value within a range from −100% to 0%.

The setting portion 22 stores therein a charging limit start voltage, a charging limit end voltage, a charging limit release voltage, a charging limit release speed, a discharging limit start voltage, a discharging limit end voltage, a discharging limit release voltage, and a discharging limit release speed, these values being set in advance.

The comparing portion 24 compares the DC voltage value input from the DC voltage acquiring portion 20 with each of the charging limit start voltage, the charging limit end voltage, the charging limit release voltage, the discharging limit start voltage, the discharging limit end voltage, and the discharging limit release voltage that are stored in the setting portion 22, and outputs the comparison results to the limiter (gain) calculating portion 26.

The limiter (gain) calculating portion 26 determines, on the basis of the comparison results input from the comparing portion 24, whether the charging limit is started or released, or the discharging limit is started or released. Additionally, the limiter (gain) calculating portion 26 compares the voltage acquired by the DC voltage acquiring portion 20 with each of the charging limit start voltage, the charging limit end voltage, and the charging limit release voltage that are set in the setting portion 22, and calculates a charging limit gain and a discharging limit gain. Each of the charging limit gain and the discharging limit gain is a value within a range from 0 to 1.0. When the gain is 1.0, the charge or discharge is not limited. When the gain is 0, the charging limit or discharging limit is 0, or the charging or discharging is stopped. The limiter (gain) calculating portion 26 outputs the calculated gain to the limiter processing portion 30.

The limiter processing portion 30 calculates upper and lower limiters of the command value on the basis of the charging limit gain and the discharging limit gain that are input from the limiter (gain) calculating portion 26. The limiter processing portion 30 performs a limiter process on the charging and discharging command value from the higher-level apparatus that is acquired by the command value acquiring portion 28 using the calculated upper and lower limiters of the command value. The limiter processing portion 30 outputs the processed command value to the command value output portion 32.

For example, to discharge the storage battery 100, the command value output portion 32 sets the command value to a value within a range from 0% to +100%. Additionally, to charge the storage battery 100, the command value output portion 32 sets the command value to a value within a range from −100% to 0%. Accordingly, in the case where the limiter processing portion 30 does not perform the setting to limit the upper limit and the lower limit of the command value, the command value output portion 32 outputs the command value within the range of −100% to +100%.

On the other hand, in the case where each of the upper limit and the lower limit of the command value (e.g., a P command value) is limited by the setting performed by the limiter processing portion 30, the command value output portion 32 outputs, to the inverter circuit 14, the command value within the limited range. That is, the limiter processing portion 30 sets the limiters to the upper limit and the lower limit of the command value that is output by the command value output portion 32 on the basis of the charging and discharging instruction from the higher-level apparatus.

Figure 3:
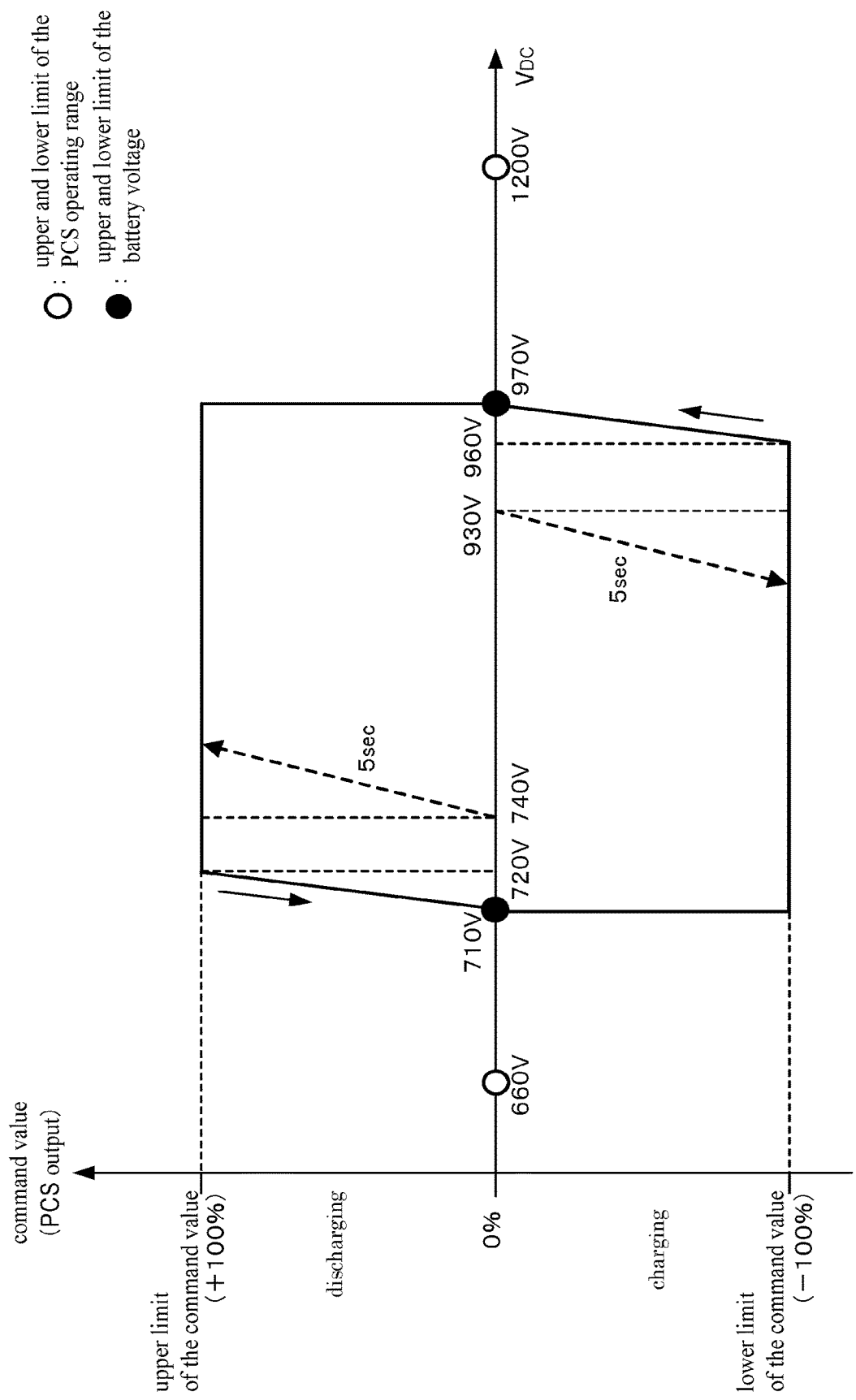
FIG. 3 is a graph illustrating an example of control (limitation) of an upper limit and a lower limit of a command value to a storage battery.
Figure 4:
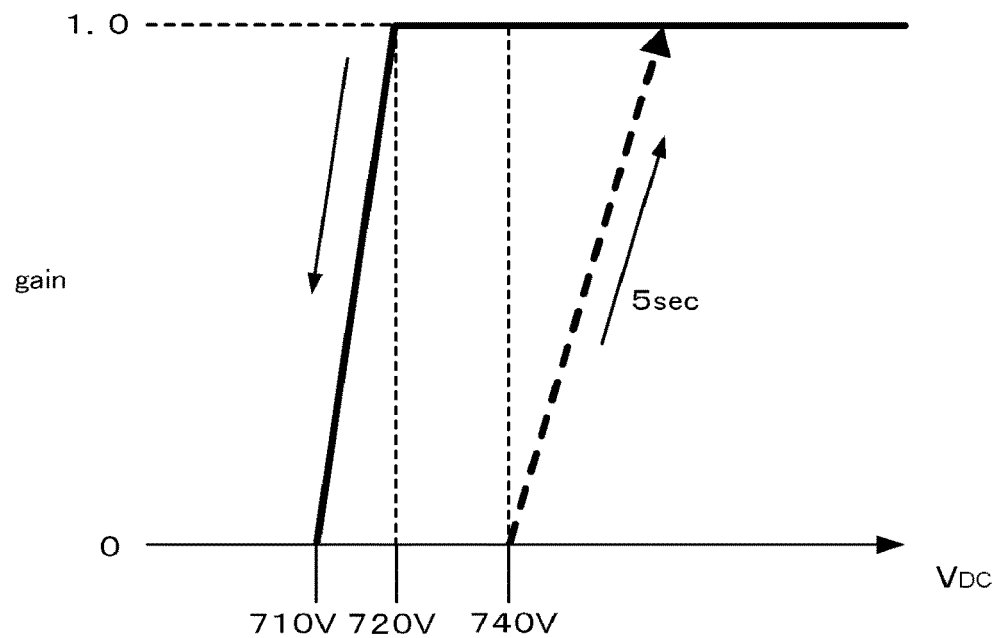
FIG. 4 is a graph illustrating an example of control of a gain applied to the upper limit of the command value to the storage battery.
Figure 5:
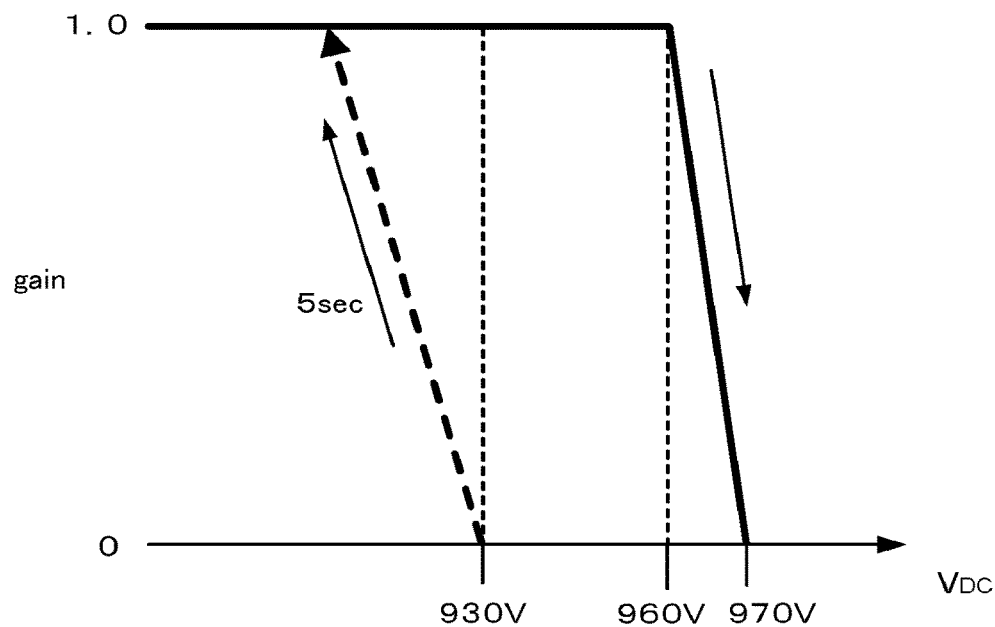
FIG. 5 is a graph illustrating an example of control of a gain applied to the lower limit of the command value to the storage battery.

More specifically, the limiter processing portion 30 performs, for the command value output portion 32, the following plurality of settings as illustrated in FIGS. 3 to 5, for example.

However, a discharging limit voltage value (e.g., 720 V), a discharging limit release voltage value (e.g., 740 V), a charging limit voltage value (e.g., 960 V), and a charging limit release voltage value (e.g., 930 V), which are used below, and a procedure of allowing the command value output by the command value output portion 32 to sequentially approach each of the maximum value and the minimum value are determined in advance according to the characteristics of the storage battery 100.

Firstly, the case where the storage battery 100 approaches the discharging end will be described. When the voltage of the storage battery 100 decreases, and the voltage decreases to a predetermined value or lower, the limiter processing portion 30 applies a gain to gradually lower the upper limit of the command value output by the command value output portion 32 from +100% to 0% according to the voltage level of the storage battery 100, to thereby prevent overdischarge of the storage battery 100.

For example, in the case where the DC voltage acquired by the DC voltage acquiring portion 20 changes from a voltage equal to or higher than the predetermined value to the predetermined discharging limit voltage value (720 V) or lower, the limiter processing portion 30 sets to limit by lowering the upper limit of the command value output by the command value output portion 32 on the basis of the DC voltage acquired by the DC voltage acquiring portion 20 (see FIGS. 3 and 4).

At this time, the output current of the storage battery 100 decreases, whereby the voltage applied to an internal resistance R of the storage battery 100 decreases and the output voltage of the storage battery 100 temporarily increases. Then, to prevent the lowered upper limit of the command value from being raised again due to the recovery of the output voltage of the storage battery 100, the limiter processing portion 30 sets the command value to satisfy the following expression (1) in the case where the output voltage of the storage battery 100 becomes equal to or lower than the discharging limit voltage value (720 V).

$$\text{Command value} = \text{MIN}\{\text{Previous command value upper limit}, \text{Present command value upper limit}\} \quad (1)$$

In the case where the output voltage of the storage battery 100 becomes equal to or lower than the discharging limit voltage value (720 V), the limiter processing portion 30 does not release the setting to limit the upper limit of the command value until the output voltage of the storage battery 100 is recovered (charged) to become equal to or higher than the predetermined valve.

For example, after the DC voltage acquired by the DC voltage acquiring portion 20 becomes equal to or lower than the discharging limit voltage value (720 V), the limiter processing portion 30 sets to limit the command value output by the command value output portion 32 to be equal to or less than the previous command value until the DC voltage acquired by the DC voltage acquiring portion 20 becomes equal to or higher than the predetermined discharging limit release voltage value (740 V).

In the case where the command value output portion 32 outputs the command value for charging the storage battery 100 to thereby recover the output voltage of the storage battery 100 to the predetermined value or higher, the limiter processing portion 30 releases the setting to lower the upper limit of the command value. At this time, the limiter processing portion 30 raises the upper limit of the command value to +100% while gradually raising the upper limit of the command value over a predetermined time period (e.g., five seconds) or at a predetermined rate of change, without releasing the setting to lower the upper limit of the command value at one time.

For example, in the case where the DC voltage acquired by the DC voltage acquiring portion 20 increases from the discharging limit voltage value (720 V) to the discharging limit release voltage value (740 V), the limiter processing portion 30 sets the command value output by the command value output portion 32 to sequentially approach the maximum value (+100%) in multiple steps.

At this time, the output current of the storage battery 100 increases, whereby the voltage applied to the internal resistance R of the storage battery 100 increases and the output voltage of the storage battery 100 temporarily decreases. Then, to prevent the raised upper limit of the command value from lowering again due to the recovery of the output voltage of the storage battery 100, the limiter processing portion 30 sets the command value to satisfy the following expression (2) in the case where the output voltage of the storage battery 100 becomes equal to or higher than the discharging limit release voltage value (740 V).

$$\text{Command value} = \text{MAX}\{\text{Previous command value upper limit}, \text{Present command value upper limit}\} \quad (2)$$

That is, after the DC voltage acquired by the DC voltage acquiring portion 20 increases to the discharging limit release voltage value (740 V), the limiter processing portion 30 sets to limit the command value output by the command value output portion 32 to be equal to or more than the previous command value.

Next, the case where the storage battery 100 approaches the charging end will be described. When the voltage of the storage battery 100 increases, and the voltage increases to a predetermined value or higher, the limiter processing portion 30 applies a gain to gradually raise the lower limit of the command value output by the command value output portion 32 from −100% to 0% according to the voltage level of the storage battery 100, to thereby prevent overcharge of the storage battery 100.

For example, in the case where the DC voltage acquired by the DC voltage acquiring portion 20 changes from a voltage equal to or lower than the predetermined value to a predetermined charging limit voltage value (960 V) or higher, the limiter processing portion 30 sets to limit by raising the lower limit of the command value output by the command value output portion 32 on the basis of the DC voltage acquired by the DC voltage acquiring portion 20 (see FIGS. 3 and 5).

At this time, the voltage applied to the internal resistance R of the storage battery 100 increases and the output voltage of the storage battery 100 temporarily decreases. Then, to prevent the raised lower limit of the command value from lowering again due to the recovery of the output voltage of the storage battery 100, the limiter processing portion 30 sets the command value to satisfy the following expression (3) in the case where the output voltage of the storage battery 100 becomes equal to or higher than the charging limit voltage value (960 V).

$$\text{Command value} = \text{MAX}\{\text{Previous command value lower limit}, \text{Present command value lower limit}\} \quad (3)$$

In the case where the output voltage of the storage battery 100 becomes equal to or higher than the charging limit voltage value (960 V), the limiter processing portion 30 does not release the setting to limit the lower limit of the command value until the output voltage of the storage battery 100 becomes equal to or lower than the predetermined valve (or is discharged).

For example, after the DC voltage acquired by the DC voltage acquiring portion 20 becomes equal to or higher than the charging limit voltage value (960 V), the limiter processing portion 30 sets to limit the command value output by the command value output portion 32 to be equal to or more than the previous command value until the DC voltage acquired by the DC voltage acquiring portion 20 becomes equal to or lower than the predetermined charging limit release voltage value (930 V).

In the case where the command value output portion 32 outputs the command value to discharge the storage battery 100, whereby the output voltage of the storage battery 100 becomes equal to or lower than the predetermined value, the limiter processing portion 30 releases the setting to raise the lower limit of the command value. At this time, the limiter processing portion 30 lower the lower limit of the command value to −100% while gradually lowering the lower limit of the command value over a predetermined time period (e.g., five seconds) or at a predetermined rate of change, without releasing the setting to raise the lower limit of the command value at one time.

For example, in the case where the DC voltage acquired by the DC voltage acquiring portion 20 decreases from the charging limit voltage value (960 V) to the charging limit release voltage value (930 V), the limiter processing portion 30 sets the command value output by the command value output portion 32 to sequentially approach the minimum value (−100%) in multiple steps.

At this time, the voltage applied to the internal resistance R of the storage battery 100 decreases and the output voltage of the storage battery 100 temporarily increases. Then, to prevent the lowered lower limit of the command value from being raised again due to the decrease in the output voltage of the storage battery 100, the limiter processing portion 30 sets the command value to satisfy the following expression (4) in the case where the output voltage of the storage battery 100 becomes equal to or lower than the charging limit release voltage value (930 V).

Command value=MIN{Previous command value lower limit, Present command value lower limit} (4)

That is, after the DC voltage acquired by the DC voltage acquiring portion 20 decreases to the charging limit release voltage value (930 V), the limiter processing portion 30 sets to limit the command value output by the command value output portion 32 to be equal to or less than the previous command value.

Figure 6:
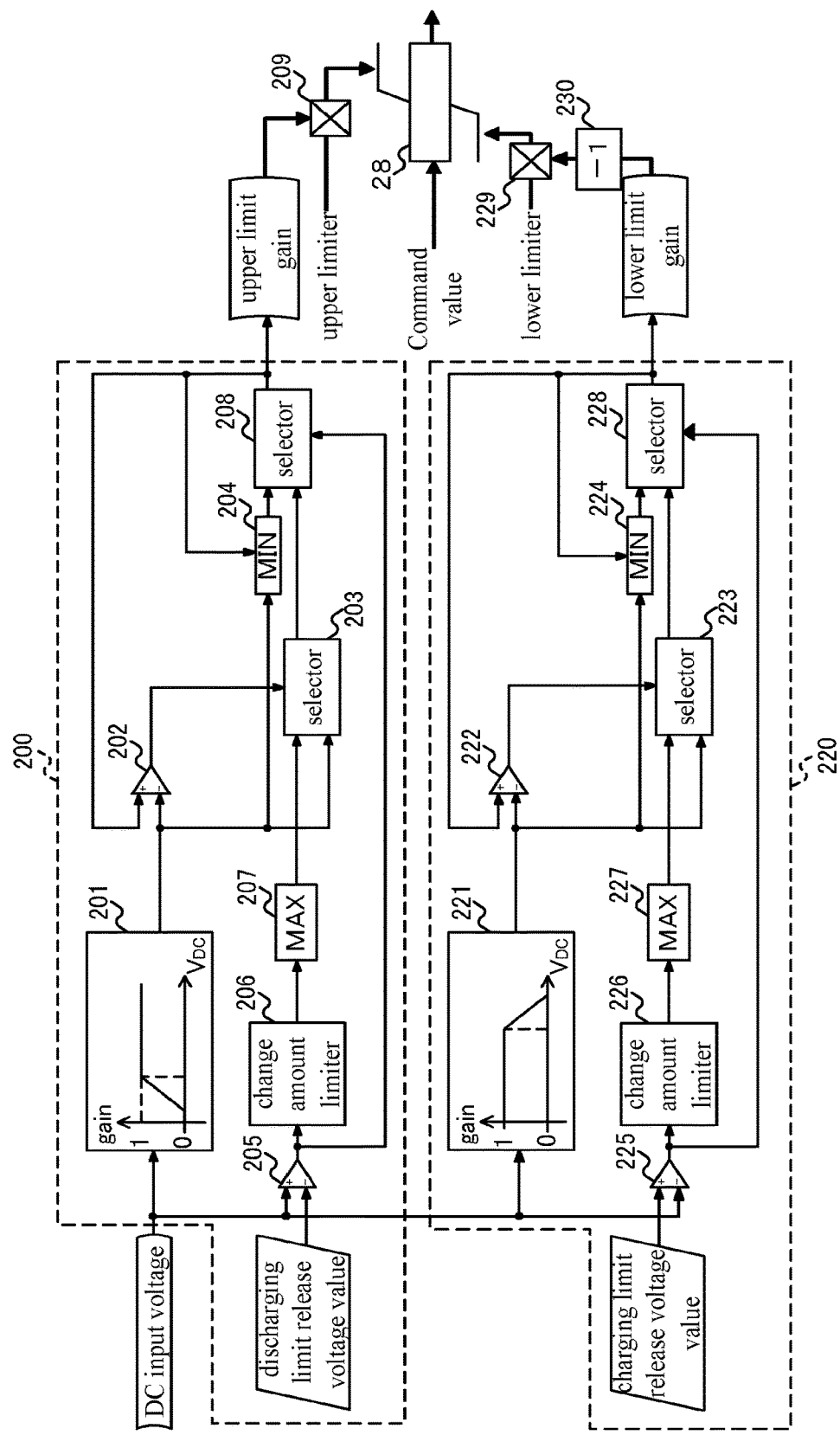
FIG. 6 is a diagram illustrating a sequence of processes to be performed by a control unit.

Next, a specific example of processes to be performed by the control unit 2 will be described. FIG. 6 is a diagram illustrating a sequence of processes to be performed by the control unit 2. As illustrated in FIG. 6, the control unit 2 performs an upper limit limitation process 200 of determining an upper limit gain for limiting an upper limit and a lower limit limitation process 220 of determining a lower limit gain for limiting a lower limit to the command value P, for example.

In the upper limit limitation process 200, a gain setting portion 201 sets an upper limit gain based on the DC input voltage to the inverter circuit 14 (FIG. 1), and outputs the upper limit gain to a comparator 202 and a selector 203. The comparator 202 compares a previous upper limit gain with a present upper limit gain, and outputs the comparation result to the selector 203. A minimum value selector (MIN) 204 compares the previous upper limit gain with the present upper limit gain, and outputs a relatively small upper limit gain to a selector 208.

A comparator 205 compares the DC input voltage to the inverter circuit 14 with the discharging limit release voltage value (740 V), and outputs the comparison result to a change amount limiter 206 and the selector 208. In the case where the DC input voltage is equal to or higher than the discharging limit release voltage value (740 V), the change amount limiter 206 performs the process of determining the upper limit gain to gradually raise the upper limit of the command value over a time period of five seconds (or 10 seconds), for example.

To prevent the raised upper limit of the command value from lowering again due to the recovery of the output voltage of the storage battery 100, a maximum value selector (MAX) 207 determines the upper limit gain to satisfy the above expression (2) in the case where the output voltage of the storage battery 100 becomes equal to or higher than the discharging limit release voltage value (740 V). Then, the maximum value selector 207 outputs the determined upper limit gain to the selector 203.

The selector 203 outputs, to the selector 208, the upper limit gain based on a value input from the gain setting portion 201 or the maximum value selector 207, on the basis of the comparison result input from the comparator 202.

The selector 208 outputs, to a multiplier 209, the upper limit gain based on a value input from the selector 203 or the minimum value selector 204, on the basis of the comparison result input from the comparator 205.

The multiplier 209 multiplies the maximum value (+100%) of the command value preset in the command value output portion 32 (see FIG. 2) by the upper limit gain input from the selector 208, and limits the upper limit of the command value output by the command value output portion 32.

In the lower limit limitation process 220, a gain setting portion 221 sets a lower limit gain based on the DC input voltage to the inverter circuit 14 (FIG. 1), and outputs the lower limit gain to a comparator 222 and a selector 223. The comparator 222 compares a previous lower limit gain with a present lower limit gain, and outputs the comparation result to the selector 223. A minimum value selector (MIN) 224 compares the previous lower limit gain with the present lower limit gain, and outputs, to a selector 228, a lower limit gain of which absolute value is relatively small.

A comparator 225 compares the DC input voltage to the inverter circuit 14 with the charging limit release voltage value (930 V), and outputs the comparison result to a change amount limiter 226 and the selector 228. In the case where the DC input voltage is equal to or lower than the charging limit release voltage value (930 V), the change amount limiter 226 performs the process of determining the lower limit gain to gradually change the lower limit of the command value over a time period of five seconds (or 10 seconds), for example.

To prevent the lowered lower limit of the command value from being raised again due to the decrease in the output voltage of the storage battery 100, a maximum value selector (MAX) 227 outputs, to the selector 223, a lower limit gain of which absolute value is relatively large, in the case where the output voltage of the storage battery 100 becomes equal to or lower than the charging limit release voltage value (930 V).

The selector 223 outputs, to the selector 228, the lower limit gain based on a value input from the gain setting portion 221 or a maximum value selector 227, on the basis of the comparison result input from the comparator 222.

The selector 228 outputs, to a multiplier 229 via a polarity reverser 230, the lower limit gain based on a value input from the selector 223 or a minimum value selector 224, on the basis of the comparison result input from the comparator 225. The polarity reverser 230 reverses the polarity of the lower limit gain value.

The multiplier 229 multiplies the minimum value (−100%) of the command value preset in the command value output portion 32 (see FIG. 2) by the lower limit gain input from the polarity reverser 230, and limits the lower limit of the command value output by the command value output portion 32.

As illustrated in FIGS. 7 to 10, four possible combinations exist for the relationship between the voltage range serviced by the power conditioning subsystem 1 and the voltage range of the storage battery 100.

Figure 7:
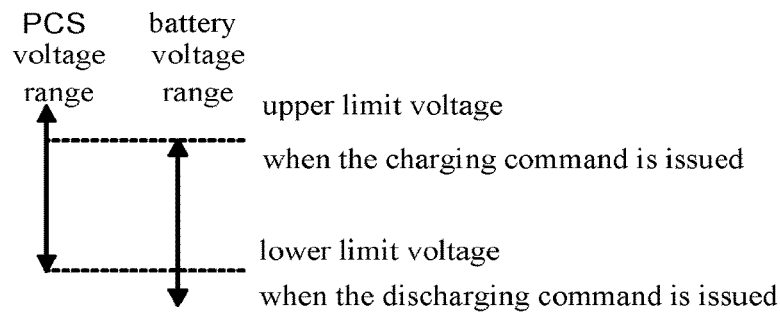
FIG. 7 is a graph illustrating a relationship between a voltage range of the power conditioning subsystem and a voltage range of the storage battery.

For example, as illustrated in FIG. 7, the upper limit voltage of the storage battery 100 may be within the voltage range serviced by the power conditioning subsystem 1, but the lower limit voltage of the storage battery 100 may be outside the voltage range serviced the power conditioning subsystem 1.

Figure 8:
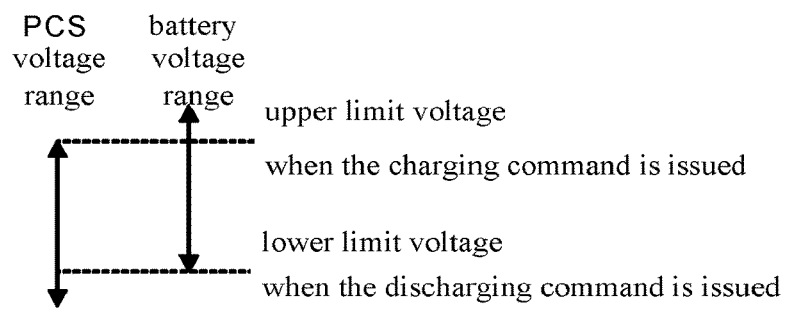
FIG. 8 is a graph illustrating a relationship between the voltage range of the power conditioning subsystem and the voltage range of the storage battery.

As illustrated in FIG. 8, the upper limit voltage of the storage battery 100 may be outside the voltage range serviced by the power conditioning subsystem 1, but the lower limit voltage of the storage battery 100 may be within the voltage range serviced by the power conditioning subsystem 1.

Figure 9:
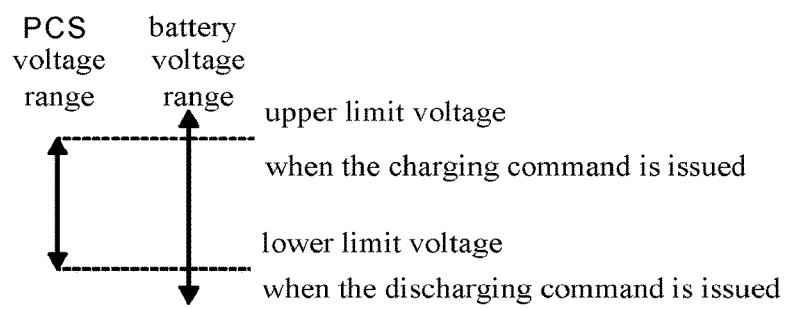
FIG. 9 is a graph illustrating a relationship between the voltage range of the power conditioning subsystem and the voltage range of the storage battery.

As illustrated in FIG. 9, both of the upper limit voltage and the lower limit voltage of the storage battery 100 may be outside the voltage range serviced by the power conditioning subsystem 1.

Figure 10:
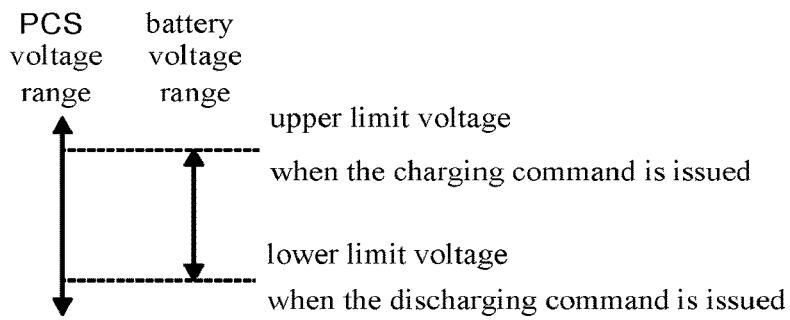
FIG. 10 is a graph illustrating a relationship between the voltage range of the power conditioning subsystem and the voltage range of the storage battery.

As illustrated in FIG. 10, both of the upper limit voltage and the lower limit voltage of the storage battery 100 may be within the voltage range serviced by the power conditioning subsystem 1. Also in the example illustrated in FIG. 3, both of the upper limit voltage and the lower limit voltage of the storage battery 100 may be within the voltage range serviced by the power conditioning subsystem 1.

Accordingly, it is necessary to set the upper limit voltage of the storage battery 100 when the charging command is issued and the lower limit voltage of the storage battery 100 when the discharging command is issued, while reflecting the voltage range serviced by the power conditioning subsystem 1 and the voltage range of the storage battery 100.

For example, the lower limit of the command value to the storage battery 100 needs to be set to satisfy the following expression (5).

$$\text{Lower limit setting value} = \text{MAX}(\text{Storage battery voltage lower limit, Power conditioning subsystem operating voltage lower limit}) \quad (5)$$

As a specific example, when the storage battery voltage lower limit is 660 V, and the power conditioning subsystem operating voltage lower limit is 710 V, the lower limit setting value of the command value is as represented by the following expression (6).

$$\text{Lower limit setting value} = \text{MAX}(660\ V, 710\ V) = 710\ V \quad (6)$$

Additionally, the upper limit of the command value to the storage battery 100 needs to be set to satisfy the following expression (7).

$$\text{Upper limit setting value} = \text{MIN}(\text{Storage battery voltage upper limit, Power conditioning subsystem operating voltage upper limit}) \quad (7)$$

As a specific example, when the storage battery voltage upper limit is 970 V, and the power conditioning subsystem operating voltage upper limit is 1200 V, the upper limit setting value of the command value is as represented by the following expression (8).

$$\text{Upper limit setting value} = \text{MIN}(970\ V, 1200\ V) = 970\ V \quad (8)$$

As described above, the power conditioning subsystem 1 according to an embodiment includes the limiter processing portion 30 configured to set to limit the upper limit and the lower limit of the command value output by the command value output portion 32, on the basis of the DC voltage acquired by the DC voltage acquiring portion 20, whereby the overcharge or overdischarge of the storage battery 100 can be prevented with a simple configuration.

With respect to each function of the control to be performed by the control unit 2, a part or all thereof may be achieved by hardware such as a programmable logic device (PLD) and a field programmable gate array (FPGA) or may be implemented by a program executed by a processor such as a CPU.

REFERENCE SIGNS LIST

1 Power conditioning subsystem
2 Control unit
10-1, 10-2 DC power supply connection portion
12 System connecting portion
14 Inverter circuit
16-1, 16-2 DC current breaker
18 AC current breaker
20 DC voltage acquiring portion
22 Setting portion
24 Comparing portion
26 Limiter (gain) calculating portion
28 Command value acquiring portion
30 Limiter processing portion
32 Command value output portion
100 Storage battery

The invention claimed is:

1. A power conditioning subsystem, comprising:
an inverter circuit configured to mutually convert direct current (DC) power of a storage battery and alternating current (AC) power;
a command value acquiring portion configured to acquire a command value from a higher-level apparatus to charge or discharge the storage battery;
a DC voltage acquiring portion configured to acquire a DC voltage on the storage battery side; and
a limiter processing portion configured to perform a process of setting to limit each of an upper limit and a lower limit of the command value acquired by the command value acquiring portion on the basis of the DC voltage acquired by the DC voltage acquiring portion,
wherein the limiter processing portion is configured to
set to limit by lowering the upper limit of the command value output by a command value output portion on the basis of the DC voltage acquired by the DC voltage acquiring portion in a case where the DC voltage acquired by the DC voltage acquiring portion changes from a voltage equal to or higher than a predetermined value to a predetermined discharging limit voltage value or lower,
set to limit by raising the lower limit of the command value output by the command value output portion on the basis of the DC voltage acquired by the DC voltage acquiring portion in a case where the DC voltage acquired by the DC voltage acquiring portion changes from a voltage equal to or lower than a predetermined value to a predetermined charging limit voltage value or higher,
set to limit the command value output by the command value output portion to be equal to or less than a previous command value until the DC voltage acquired by the DC voltage acquiring portion becomes equal to or higher than a predetermined discharging limit release voltage value, after the DC voltage acquired by the DC voltage acquiring portion becomes equal to or lower than the discharging limit voltage value, and
set to limit the command value output by the command value output portion to be equal to or more than a previous command value until the DC voltage acquired by the DC voltage acquiring portion becomes equal to or lower than a predetermined charging limit release voltage value, after the DC voltage acquired by the DC voltage acquiring portion becomes equal to or more than the charging limit voltage value.

2. The power conditioning subsystem according to claim 1, wherein
the limiter processing portion is configured to
set, in a case where the DC voltage acquired by the DC voltage acquiring portion increases from the discharging limit voltage value to the discharging limit release voltage value, the command value output by the command value output portion to sequentially approach a maximum value in multiple steps, and set, in a case where the DC voltage acquired by the DC voltage acquiring portion decreases from the charging limit voltage value to the charging limit release voltage value, the command value output by the command value output portion to sequentially approach a minimum value in multiple steps.

3. The power conditioning subsystem according to claim 2, wherein the limiter processing portion is configured to set to limit the command value output by the command value output portion to be equal to or more than a previous command value after the DC voltage acquired by the DC voltage acquiring portion increases to the discharging limit release voltage value, and, set to limit the command value output by the command value output portion to be equal to or less than a previous command value after the DC voltage acquired by the DC voltage acquiring portion decreases to the charging limit release voltage value.

4. The power conditioning subsystem according to claim 3, wherein the limiter processing portion is configured to determine in advance the discharging limit voltage value, the discharging limit release voltage value, the charging limit voltage value, the charging limit release voltage value, and a procedure of allowing the command value output by the command value output portion to sequentially approach each of a maximum value and a minimum value according to characteristics of the storage battery.

* * * * *